(12) United States Patent
van der Velden

(10) Patent No.: US 12,355,353 B2
(45) Date of Patent: Jul. 8, 2025

(54) TRENCH-GATE SEMICONDUCTOR DEVICE AND METHOD FOR MANUFACTURING THE SAME

(71) Applicant: NEXPERIA B.V., Nijmegen (NL)

(72) Inventor: Joram Pieter van der Velden, Nijmegen (NL)

(73) Assignee: NEXPERIA B.V., Nijmegen (NL)

(*) Notice: Subject to any disclaimer, the term of this patent is extended or adjusted under 35 U.S.C. 154(b) by 272 days.

(21) Appl. No.: 18/303,917

(22) Filed: Apr. 20, 2023

(65) Prior Publication Data
US 2023/0344342 A1    Oct. 26, 2023

(30) Foreign Application Priority Data

Apr. 22, 2022  (NL) .................................... 2031660

(51) Int. Cl.
*H02M 3/158*  (2006.01)
*H02M 1/00*  (2006.01)
*H02M 3/07*  (2006.01)

(52) U.S. Cl.
CPC ........... *H02M 3/158* (2013.01); *H02M 1/009* (2021.05); *H02M 3/07* (2013.01)

(58) Field of Classification Search
CPC ......... H02M 3/158; H02M 1/009; H02M 3/07
See application file for complete search history.

(56) References Cited

U.S. PATENT DOCUMENTS

| | | | |
|---|---|---|---|
| 10,715,037 B2 * | 7/2020 | Xiong | ............... H02M 3/07 |
| 2020/0244161 A1 * | 7/2020 | Hou | ............. H02J 7/00712 |

* cited by examiner

*Primary Examiner* — Adolf D Berhane
(74) *Attorney, Agent, or Firm* — Ruggiero McAllister & McMahon LLC

(57) ABSTRACT

An inductor-less power converter for converting an input voltage at an input terminal to an output voltage at an output terminal is provided, with a conversion ratio between the input and output voltage. The converter can be an inductor-less power converter which is configured for Direct Current, DC, to DC, DC-DC conversion of an input voltage to an output voltage. The input voltage is provided at an input terminal pair whereas the output voltage is provided at an output terminal pair. The ratio between the input voltage and the output voltage defines the conversion ratio, which may be either larger than one or smaller than one, meaning that the voltage may be stepped-up or stepped-down and thus increased or lowered.

17 Claims, 3 Drawing Sheets

TRENCH-GATE SEMICONDUCTOR DEVICE AND METHOD FOR MANUFACTURING THE SAME

CROSS-REFERENCE TO RELATED APPLICATIONS

This application claims the benefit under 35 U.S.C. § 119(a) of Dutch Application No. 2031660 filed Apr. 22, 2022, the contents of which are incorporated by reference herein in their entirety.

BACKGROUND

1. Field of the Disclosure

The present disclosure relates generally power converters. More specifically relates the present disclosure to inductor-less power converters having several stages of switched capacitors for converting an input voltage to an output voltage at a conversion ratio.

2. Description of the Related Art

Power converters are electric devices for converting an input voltage to an output voltage. These voltages may differ according to a conversion ratio and the input current may differ in form and/or frequency from the output current, e.g. the converter may be arranged to convert an Alternating Current, AC, input voltage to a Direct Current, DC, output voltage, preferably of a different voltage differential.

Such power converters for converting the electrical energy from one voltage level to another, or from one frequency to another, or from one type into another, are typically used in portable electronic devices such a cellular phone, laptop computer, portable computers, but are also widely used in Internet-of-Things, IoT, devices or Wireless Sensor Nodes, WSNs. In such applications the main power supply often (primarily) comes from a battery and often these devices further have an energy harvesting module to harvest energy to charge the battery and/or power the load.

Power converters designed around a series of switches and capacitors are well known and widely used. Recently switched capacitor designs with several stages are becoming increasingly popular. Such designs have advantages over known inductor based power converters as there are no magnetic or large formfactor components, which makes them suitable for small integrational designs or even fully integrated implementations.

Also, such designs do not require dummy loads and are usable in a wider range of loads. Also, the conversion efficiency of these power converters is typically higher than those of inductor based alternatives. All in all such inductor-less designs are typically ideal for battery-operated applications.

Inductor-less designs however also have drawbacks as compared to the inductor based alternatives, as inductor based power converters have large to a continue conversion ratios, whereas inductor-less designs have a limited discrete number of conversion ratios and low maximum and/or minimum conversion ratio. Furthermore, inductor-less power converters may have different conversion ratios but switching between the ratios results in loss of energy which lowers the overall performance of the converter, especially when compared to inductor based alternatives, which have continuous conversion ratios such that switching from one ratio to another does not result in energy-loss.

There is therefore a need for an improved inductor-less power converter, which power converter is configured for switching between a plurality of conversion ratios, and wherein the overall energy loss of the power converter is improved.

SUMMARY

In a first aspect there is provided an inductor-less power converter for converting an input voltage at an input terminal to an output voltage at an output terminal, with a conversion ratio between said input and output voltage, said power converter comprising a plurality of cascaded capacitor stages, each capacitor stage comprising a flying capacitor connected in parallel over an input terminal pair and an output terminal pair of said capacitor stage, and wherein between each cascaded stage a switching block is provided, said switching block comprising an input terminal pair and an output terminal pair and switching means for connecting one or the input terminals with one of the output terminal of the switching blocks, for connecting one of a top or bottom plate of a capacitor of a respective capacitor stage with a top plate or bottom plate of a capacitor of a respective subsequent cascaded capacitor stage, wherein the power converter further comprises a control unit arranged to operate the switching means of each switching block according to a selected conversion ratio setting of a list of predefined conversion ratio setting each representing a different conversion ratio and comprising a connecting state of each of the switching blocks, wherein the predefined conversion ratio setting are defined such that a steady state voltage of each flying capacitor is equal between each conversion ratio setting, for switching between the conversion ratio setting in a lossless manner.

The proposed converter is an inductor-less power converter which is configured for Direct Current, DC, to DC, DC-DC conversion of an input voltage to an output voltage. The input voltage is provided at an input terminal pair whereas the output voltage is provided at an output terminal pair. The ratio between the input voltage and the output voltage defines the conversion ratio, which may be either larger than one or smaller than one, meaning that the voltage may be stepped-up or stepped-down and thus increased or lowered.

The converter is a switched capacitor converter, or in particular, a DC-DC switched capacitor converter. The converter consists of several stages which may be considered cascaded stages each having a capacitor or flying capacitor. The capacitors may be charged and discharged according to the way these are connected. The way of the capacitors are connected is defined by the way in which a switching block is operated which is connected between each of the flying capacitors or also defined as capacitor stages. Hence, the converter has n capacitor stages, thereby having n flying capacitors, and between each capacitor stage a switching block, having switching means e.g. comprising integrated switching means such as transistors. The switching blocks may also be present between each capacitor stage and the input terminals and the output terminals.

The switching means of each switching block may have four terminals, an input terminal pair and an output terminal pair, thus one of the terminals connected to the top plate of the preceding capacitor stage (or input terminal for the first switching block), one connected to the top plate of the subsequent capacitor stage (or output terminal for the last switching block), one to the bottom plate of the preceding capacitor stage (or ground for the first switching block), and one connected to the bottom plate of the subsequent capacitor stage (or ground for the last switching block). The switching means are arranged to connect either one of the input terminal pair with one of the output terminal pair, thus either the top plate of a preceding capacitor stage with the top plate of the subsequent capacitor stage, or the top plate of a preceding capacitor stage with the bottom plate of a subsequent capacitor stage, or the bottom plate of a preceding capacitor stage with the top plate of the subsequent capacitor stage, or the bottom plate of a preceding capacitor stage with the bottom plate of a subsequent capacitor stage.

Given the different ways of control of the switching means and thus the way in which each capacitor is connected, the number of capacitor stages, and thus also the number of switching blocks, defines the number of conversion ratio options. An increase in stages will increase the number of configurable conversion ratios.

Although the switching means may be operated according to several conversion ratio settings, is has been found that switching between these settings may result in efficiency loss of the converter. In particular, the inventor has found that such efficiency loss may be reduced or even obviated in some cases. It was the insight of the inventor that switching between conversion ratios can be achieved in a lossless-manner and thus without or at least with minimal efficiency-loss, when the steady state voltages of each flying capacitor is kept equal between the conversion ratios. Hence, of all possible conversion ratios, the control unit may be configured to only allow selection of a conversion ratio setting when this requirement is maintained. Thus, a current conversion ratio may be changed by the controller into a next conversion ratio in accordance with a list or sub-selection of all conversion ratio settings for which it has been determined that the steady state voltages of each flying capacitor is kept equal between the current and subsequent conversion ratio, hence conversion ratio setting.

With the proposed power converter a conversion can be achieved according to a number of discrete conversion ratios, and according to either a step-up or step-down conversion, e.g. operating the converter in either a buck-mode or boost-mode. The proposed power converter has the advantage that the energy-loss associated with discharging and/or charging of the flying capacitors is kept minimal or completely resolved. Also, conventional power converters based on flying capacitors or switching capacitors may require settling time between the conversion ratio setting which lowers in operational effectiveness and efficiency. The proposed power converter also has the advantage that it allows a fully integrated IC design.

In an example, the converter comprises four cascaded capacitor stages.

In an example, the converter comprises five switching blocks.

In an example, the control unit comprises a memory unit for storing the list of predefined conversion ratio settings, and wherein the list of predefined conversion ratio setting is a sub-selection of all conversion ratio setting possible.

In an example, the converter is arranged for a Direct Current, DC, input voltage.

In an example, the converter is arranged for converting an input voltage to an output voltage in a power range between 10 µWatt and 100 mWatt, more preferably between 50 µWatt and 50 mWatt.

In an example, the converter is arranged for powering one or more of a sensor module, IoT device, USB device, or Bluetooth module.

In an example, the converter further comprises multiple output voltage rails, comprising a plurality outputs, each having a different output voltage level, wherein each output comprises a output capacitor connected in parallel over the output, as well as switching output means for connecting the voltage rail to the respective output.

In an example, each switching output means are activated in a sequential manner for sequentially charging each of the output capacitors.

In an example, the converter further comprises a multiple input voltage rails, comprising a plurality inputs, each having a different input voltage level, wherein each input comprises an input capacitor connected in parallel over the input, as well as switching input means for connecting the voltage rail to the respective input.

In an example, each switching input means are activated in a sequential manner for sequentially charging each of the input capacitors.

In a further aspect of the present disclosure, there is provided, an energy harvester arrangement comprising:
  an energy harvesting module for harvesting ambient energy, preferably one of solar, thermal, motion or radio frequency energy and providing the harvested energy as an input voltage to the energy harvester arrangement;
  an inductor-less power converter according to any of the previous claims.

The skilled person will appreciate that the above mentioned energy harvesting modules are mere examples and that the present disclosure is not limited to these examples only, but that any other type of applicable energy source may be used with a suitable type of energy harvesting module.

In an example, the arrangement further comprises:
  a maximum power point tracking module, wherein the maximum power point tracking module is operated as the control unit of the inductor-less power converter, for operating switching means of each switching block of the power converter according to a maximum power point tracking algorithm selected in accordance with steady state voltage of each flying capacitor to be equal between each conversion ratio setting.

The disclosure will now be described in more detail by means of specific embodiments, with reference to the enclosed drawings, wherein equal or like parts and/or components are designated by the same reference numerals. The disclosure is in no manner whatsoever limited to the embodiments disclosed.

BRIEF DESCRIPTION OF DRAWINGS

The present disclosure will now be explained by means of a description of an embodiment of an inductor-less power converter in accordance to the first aspect, and an energy harvester arrangement in accordance to the second aspect, in which reference is made to the following figures, in which.

DETAILED DESCRIPTION

Figure 1:
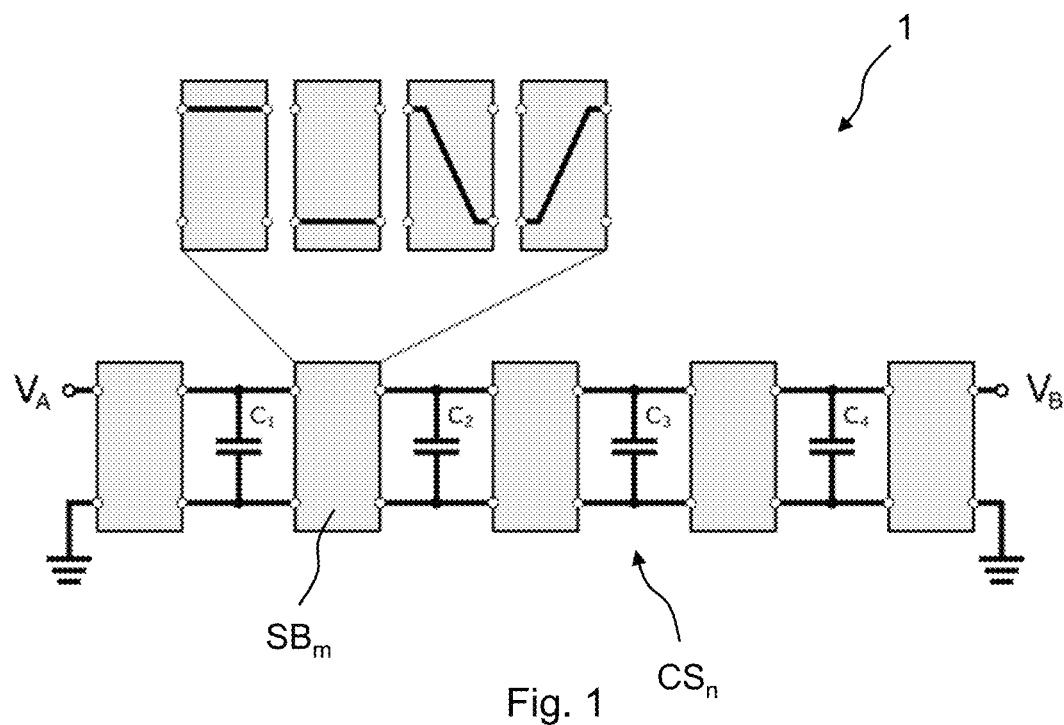
FIG. 1 shows a schematic overview of an embodiment of an inductor-less power converter in accordance to the first aspect of the present disclosure, wherein the possible connections between the input terminals and output terminals of one of the switching blocks are indicated.
Figure 2:
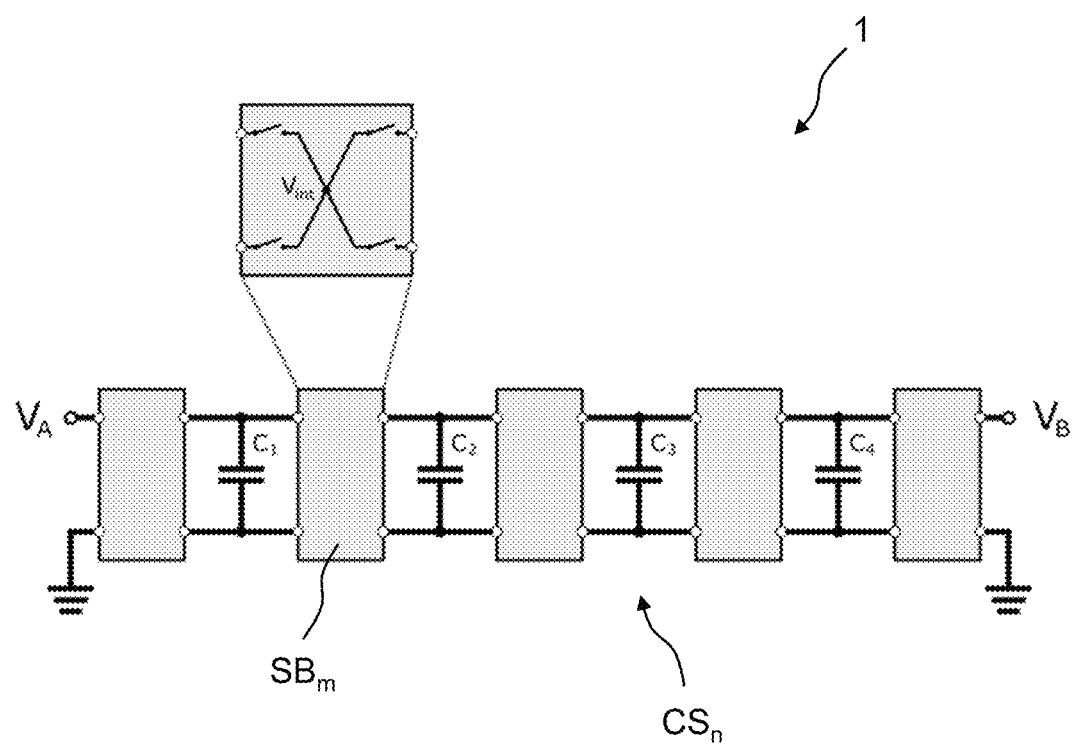
FIG. 2 shows a schematic overview of the inductor-less power converter of FIG. 1, wherein an embodiment of the switching blocks in one of the switching blocks is indicated.

FIGS. 1 and 2 show an inductor-less power converter 1 for converting an input voltage VA at an input terminal of the inductor-less power converter 1 to an output voltage VB at an output terminal of the inductor-less power converter 1. The power converter 1 comprises four cascaded capacitor stages CSn, with n=1-4, wherein each capacitor stage comprising a flying capacitor Cn, connected in parallel over an input terminal pair and an output terminal pair of the capacitor stage CSn.

Between each cascaded stage CSn a switching block SBm, with m=1-n+1, is provided. Each switching block SBm comprises an input terminal pair and an output terminal pair and switching means for connecting one of the two input terminals with one of the two output terminals of the switching block SBm. For switching block SB2, FIG. 1 shows in more detail the four possible connections between the input terminals and the output terminals of the respective switching block SB2, which is applicable to the other switching block SBm.

The first switching block SB1 is arranged for connecting either the top plate or the bottom plate of a capacitor C1, connected to the output terminals of the first switching block SB1, with either the input voltage VA of the power converter 1 or to ground. The last switching block SB5 is arranged for connecting either the top plate or the bottom plate of a capacitor C4, connected to the input terminals of the last switching block SB5, with either the output voltage VB of the power converter 1 or to ground.

Switching block SBm, with m=2-4, are arranged for connecting either the top plate or bottom plate of a capacitor Cm−1, connected to the input terminals of the respective switching block SBm, with either the top plate or bottom plate of a capacitor Cm, connected to the output terminals of the respective switching block SBm.

A control unit 21 (for clarity not shown in FIGS. 1-3) of the power converter 1 is arranged to operate the switching means of each switching block SBm according to a selected conversion ratio setting of a list of predefined conversion ratio setting. Each predefined conversion ratio setting represents a different conversion ratio between the input voltage VA and output voltage VB, and comprises a connecting state of each of the individual switching blocks SBm. The predefined conversion ratio setting are defined such that a steady state voltage of each flying capacitor Cn is equal between each conversion ratio setting, for switching between the conversion ratio setting in a lossless manner.

FIG. 2 shows an embodiment of the switching block SBm, wherein the switching block SBm comprises four switching means for connecting each of the input terminals and output terminals of the switching block SBm to a common internal node Vint,m. The switching means, for example transistors, are controlled by the control unit 21 of the power converter 1.

The control unit 21 comprises a memory unit 23 for storing the list of predefined conversion ratio settings, wherein the list of predefined conversion ratio settings is a sub-selection of all conversion ratio setting possible.

The voltage of each capacitor, can be added or subtracted from the respective internal node voltage Vint,m to create the following internal node voltage Vint,m+1. For the internal voltages Vint,m the following applies:

$$V_{int,1} = \begin{cases} 0 \\ V_A = w_A \cdot V_A \end{cases}$$

$$V_{int,2} = \begin{cases} V_{int,1} \\ V_{int,1} + V_{C1} = V_{int,1} + w_1 \cdot V_{C1} \\ V_{int,1} - V_{C1} \end{cases}$$

$$V_{int,3} = \begin{cases} V_{int,2} \\ V_{int,2} + V_{C2} = V_{int,2} + w_2 \cdot V_{C2} \\ V_{int,2} - V_{C2} \end{cases}$$

$$V_{int,4} = \begin{cases} V_{int,3} \\ V_{int,3} + V_{C3} = V_{int,3} + w_3 \cdot V_{C3} \\ V_{int,3} - V_{C3} \end{cases}$$

$$V_{int,5} = \begin{cases} V_{int,4} \\ V_{int,4} + V_{C4} = V_{int,4} + w_4 \cdot V_{C4} \\ V_{int,4} - V_{C4} \end{cases}$$

$$= \begin{cases} V_B \\ 0 \end{cases} = w_B \cdot V_B$$

The weight factors wA, wB and wx, with x=n=1-4, define how the capacitors are connected together. The weight factor wA can either be 0, when the ground terminal is connected to the input terminal of switching block SB1, or 1, when the input voltage VA of the power converter 1 is connected to the input terminal of switching block SB1. The weight factor wB can either be 0, when the ground terminal is connected to the output terminal of switching block SB5, or 1, when the output voltage VB of the power converter 1 is connected to the output terminal of switching block SB5. The capacitor weight factor wx, with x=n, can either be 0, when capacitor Cn is bypassed, −1, when capacitor voltage VCn is subtracted, or 1, when capacitor voltage VCn is added. For the weight factors wA, wB and wx the following applies:

$$w_A = \begin{cases} 1 \\ 0 \end{cases}$$

$$w_B = \begin{cases} 1 \\ 0 \end{cases}$$

$$w_x = \begin{cases} 1 \\ 0 \\ -1 \end{cases}$$

The following is assumed: the input voltage VA of the power converter 1 is a fixed voltage, for example provided by a battery or supply rail, the steady state voltages across the capacitors Cn are assumed to be fixed and a fraction of the input voltage VA of the power converter 1, with VCx=VA·kx, and the ratio between the input voltage VA of the power converter 1 and the output voltage VB of the power converter 1 is defined by the conversion ratio VB=VA·M.

Using the equations for the internal node voltages Vint,m, the following applies:

$$w_A \cdot V_A + w_1 \cdot V_{C1} + w_2 \cdot V_{C2} + w_3 \cdot V_{C3} + w_4 \cdot V_{C4} = w_B \cdot V_B$$

Which can be Reduced to:

$$w_A + w_1 \cdot k_1 + w_2 \cdot k_2 + w_3 \cdot k_3 + w_4 \cdot k_4 = w_B \cdot M$$

The following equation is valid for each of the phases in one conversion ratio:

$$\begin{bmatrix} w_{A,1} \\ w_{A,2} \\ w_{A,3} \\ w_{A,4} \\ w_{A,5} \end{bmatrix} + \begin{bmatrix} w_{1,1} & w_{2,1} & w_{3,1} & w_{4,1} \\ w_{1,2} & w_{2,2} & w_{3,2} & w_{4,2} \\ w_{1,3} & w_{2,3} & w_{3,3} & w_{4,3} \\ w_{1,4} & w_{2,4} & w_{3,4} & w_{4,4} \\ w_{1,5} & w_{2,5} & w_{3,5} & w_{4,5} \end{bmatrix} \cdot \begin{bmatrix} k_1 \\ k_2 \\ k_3 \\ k_4 \end{bmatrix} = \begin{bmatrix} w_{B,1} \\ w_{B,2} \\ w_{B,3} \\ w_{B,4} \\ w_{B,5} \end{bmatrix} \cdot M$$

$$\vec{w_A} + W \cdot \vec{k} = \vec{w_B} \cdot M$$

The following example illustrates how multiple conversion ratios M can be made with the same k-vector, wherein the size of k is equal to the number of capacitors n. In this example, the power converter 1 comprises four capacitors Cn, n=1-4 and five switching block SBm, m=1-5. Corresponding equations can be extended accordingly for a power converter 1 comprises more or less capacitors Cn.

For $k = \begin{bmatrix} \frac{1}{2} & \frac{1}{4} & \frac{1}{6} & \frac{1}{12} \end{bmatrix}$ & M =

$$\frac{1}{12}: \begin{bmatrix} 0 \\ 0 \\ 0 \\ 0 \\ 1 \end{bmatrix} + \begin{bmatrix} 0 & 0 & 0 & 1 \\ 0 & 0 & 1 & -1 \\ 0 & 1 & -1 & 0 \\ 1 & -1 & -1 & 0 \\ -1 & -1 & -1 & 0 \end{bmatrix} \cdot \begin{bmatrix} k_1 \\ k_2 \\ k_3 \\ k_4 \end{bmatrix} = \begin{bmatrix} 1 \\ 1 \\ 1 \\ 1 \\ 1 \end{bmatrix} \cdot M$$

For $k = \begin{bmatrix} \frac{1}{2} & \frac{1}{4} & \frac{1}{6} & \frac{1}{12} \end{bmatrix}$ & M =

$$\frac{19}{12}: \begin{bmatrix} 0 \\ 0 \\ 1 \\ 1 \\ 1 \end{bmatrix} + \begin{bmatrix} 0 & 1 & -1 & -1 \\ 1 & -1 & -1 & -1 \\ -1 & -1 & -1 & -1 \\ 1 & 0 & 0 & 1 \\ 1 & 0 & 1 & -1 \end{bmatrix} \cdot \begin{bmatrix} k_1 \\ k_2 \\ k_3 \\ k_4 \end{bmatrix} = \begin{bmatrix} 0 \\ 0 \\ 0 \\ 1 \\ 1 \end{bmatrix} \cdot M$$

Figure 3:
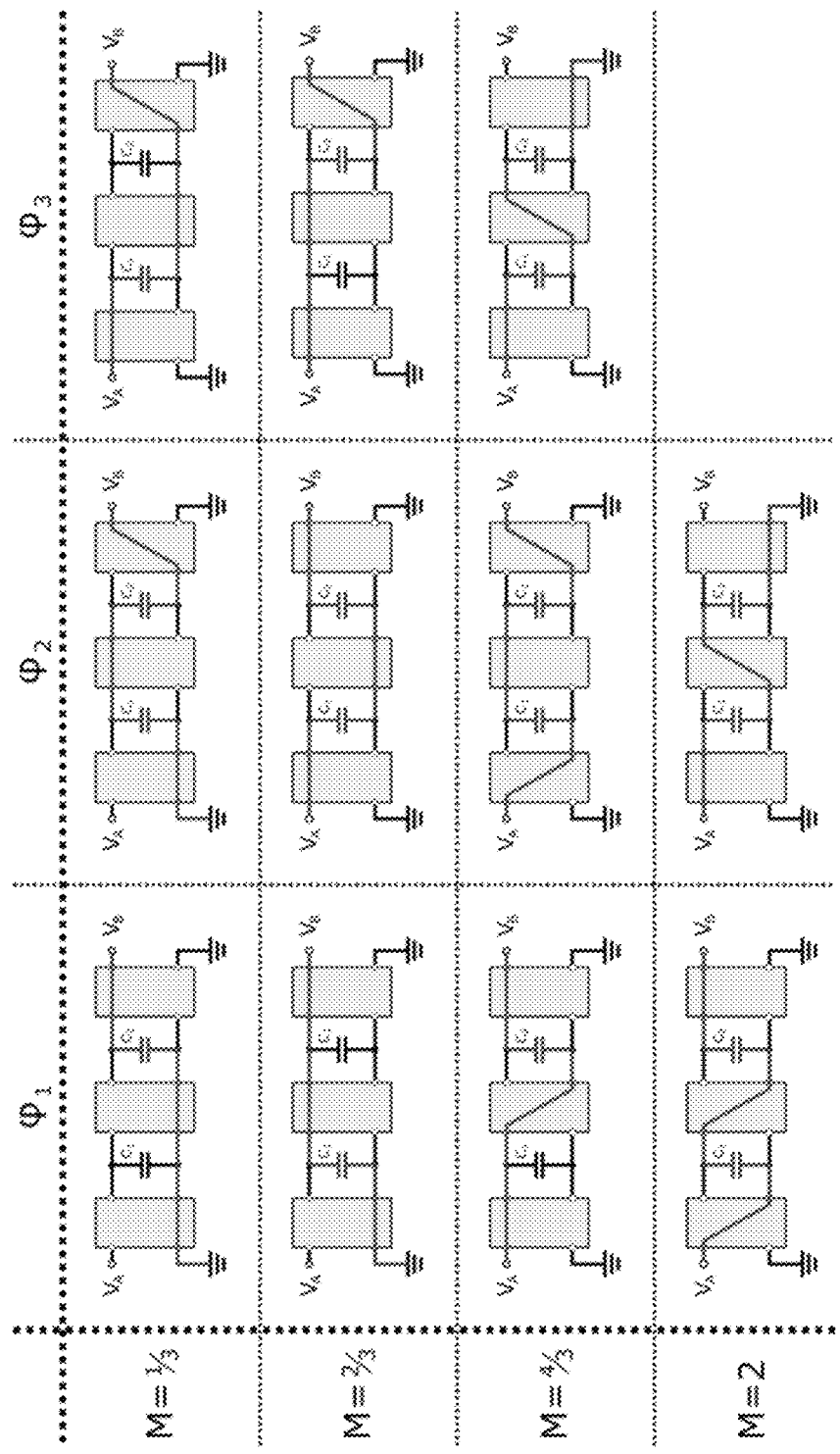
FIG. 3 shows an example of the configuration of an inductor-less power converter in accordance to the first aspect of the present disclosure for four different conversion ratios.
Figure 4:
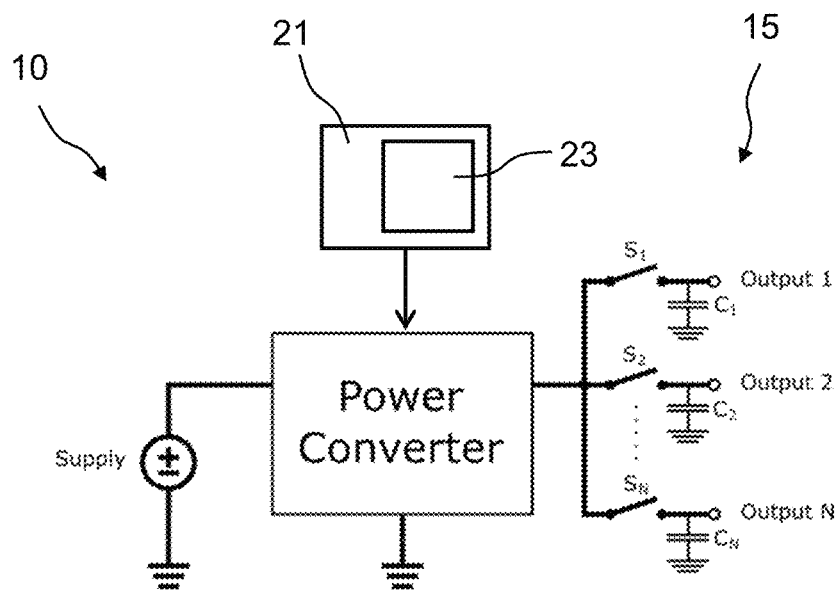
FIG. 4 shows a schematic overview of another embodiment of an inductor-less power converter in accordance to the first aspect of the present disclosure.

FIG. 3 illustrates the complete configuration for a power converter 1 with two capacitors Cn, n=1-2 and three switching block SBm, m=1-3, with k=[⅔ ⅓] such that VC1=VA·⅔ and VC2=VA·⅓, and four possible conversion ratios M. For which the following applies for the weight matrices:

For $M = \frac{1}{3}$: $\circ \begin{bmatrix} 0 \\ 0 \\ 1 \end{bmatrix} + \begin{bmatrix} 0 & 1 \\ 1 & -1 \\ -1 & 0 \end{bmatrix} \vec{k} = \begin{bmatrix} 1 \\ 1 \\ 1 \end{bmatrix} M$ For $M = \frac{2}{3}$: $\circ \begin{bmatrix} 0 \\ 1 \\ 1 \end{bmatrix} + \begin{bmatrix} 1 & 0 \\ -1 & 1 \\ 0 & -1 \end{bmatrix} \vec{k} = \begin{bmatrix} 1 \\ 1 \\ 1 \end{bmatrix} M$ For $M = \frac{4}{3}$: $\circ \begin{bmatrix} 1 \\ 1 \\ 1 \end{bmatrix} + \begin{bmatrix} 0 & 1 \\ 1 & -1 \\ -1 & -1 \end{bmatrix} \vec{k} = \begin{bmatrix} 1 \\ 1 \\ 0 \end{bmatrix} M$ For $M = 2$: $\circ \begin{bmatrix} 1 \\ 1 \end{bmatrix} + \begin{bmatrix} 1 & 1 \\ -1 & -1 \end{bmatrix} \vec{k} = \begin{bmatrix} 1 \\ 0 \end{bmatrix} M$ FIG. 4 shows another embodiment of an inductor-less power converter 10 according to first aspect of the present disclosure. The power converter 10 further comprises a multiple output voltage rail 15. The multiple output voltage rail 14 comprises a plurality outputs Output y, with y=1-N, each having a different output voltage level. Each output y comprises an output capacitor Cy, connected in parallel over the output y, and switching output means Sy, for connecting the voltage rail 14 to the respective output y.

Each switching output means Sy are activated, by the control unit 21, in a sequential manner for sequentially charging each of said output capacitors Cy.

Figure 5:
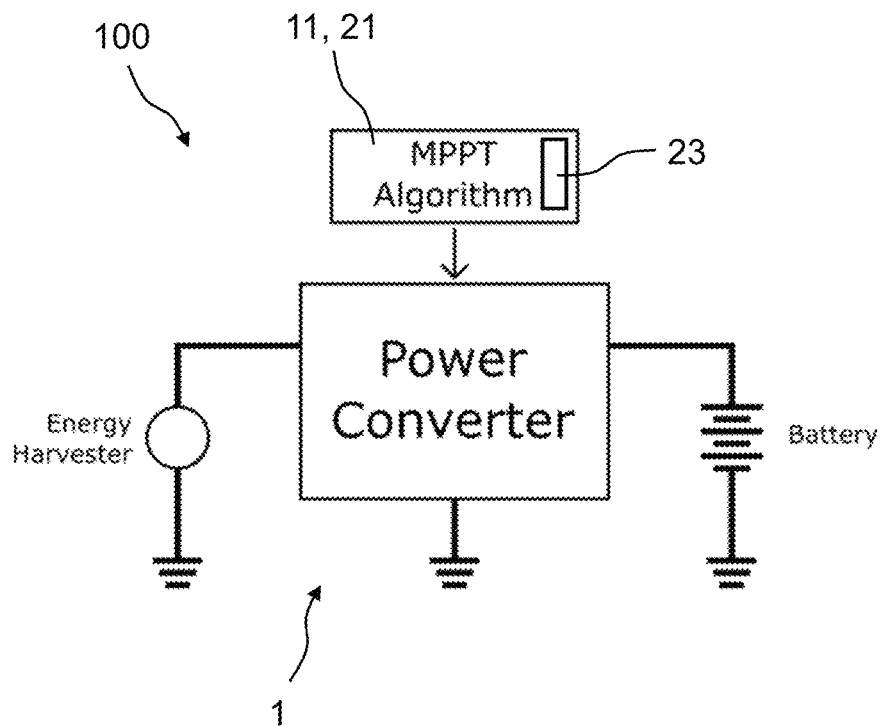
FIG. 5 shows a schematic overview of an embodiment of an energy harvester arrangement in accordance to the second aspect of the present disclosure.

FIG. 5 shows an embodiment of an energy harvester arrangement 100 in accordance to the second aspect of the present disclosure. The energy harvester arrangement 100 comprises an energy harvester for harvesting ambient energy, preferably one of solar, motion or radio frequency energy. The harvested energy is provided as an input voltage to the inductor-less power converter 1 as described above. The output voltage of the inductor-less power converter 1 is provided to a battery.

The energy harvester arrangement 100 further comprises a maximum power point tracking, MPPT, module 11, wherein the MPPT module 11 is operated as the control unit 21 of the inductor-less power converter 1. The MPPT module 11 controls the switching means of each switching block SBm of the power converter 1 according to a maximum power point tracking algorithm selected in accordance with steady state voltage of each flying capacitor Cn to be equal between each conversion ratio setting.

Based on the above description, a skilled person may provide modifications and additions to the method and arrangement disclosed, which modifications and additions are all comprised by the scope of the appended claims.

What is claimed is:

1. An inductor-less power converter for converting an input voltage at an input terminal to an output voltage at an output terminal, with a conversion ratio between the input and output voltage, the power converter comprising a plurality of cascaded capacitor stages, each capacitor stage comprising a flying capacitor connected in parallel over an input terminal pair and an output terminal pair of the capacitor stage;
   wherein between each cascaded stage a switching block is provided, the switching block comprising an input terminal pair and an output terminal pair and switching configured to connect the input terminals with one of the output terminals of the switching blocks, to connect one of a top or bottom plate of a capacitor of a respective capacitor stage with a top plate or bottom plate of a capacitor of a respective subsequent cascaded capacitor stage; and
   wherein the power converter further comprises a control unit arranged to operate the switching of each switching block according to a selected conversion ratio setting of a list of predefined conversion ratio settings each representing a different conversion ratio and comprising a connecting state of each of the switching blocks, wherein the predefined conversion ratio settings are defined so that a steady state voltage of each flying capacitor is equal between each conversion ratio setting, to switch between the conversion ratio settings in a lossless manner.

2. The inductor-less power converter according to claim 1, wherein the converter comprises four cascaded capacitor stages.

3. The inductor-less power converter according to claim 1, wherein the converter comprises five switching blocks.

4. The inductor-less power converter according to claim 1, wherein the control unit comprises a memory unit for storing the list of predefined conversion ratio settings, and wherein the list of predefined conversion ratio setting is a sub-selection of all conversion ratio settings possible.

5. The inductor-less power converter according to claim 1, wherein the converter is arranged for a Direct Current (DC) input voltage.

6. The inductor-less power converter according to claim 1, wherein the converter is arranged to convert an input voltage to an output voltage in a power range between 10 µWatts and 100 mWatts.

7. The inductor-less power converter according to claim 1, wherein the converter is arranged to power at least one module or device selected from the group consisting of: a sensor module, a IoT device, a USB device, and a Bluetooth module.

8. The inductor-less power converter according to claim 1, wherein the converter further comprises a multiple output voltage rail comprising a plurality outputs, each having a different output voltage level, wherein each output comprises a output capacitor connected in parallel over the output, as well as switching outputs configured to connect the voltage rail to the respective output.

9. The inductor-less power converter according to claim 1, wherein the converter is arranged to convert an input voltage to an output voltage in a power range between 50 µWatts and 50 mWatts.

10. The inductor-less power converter according to claim 1, wherein the converter further comprises multiple input voltage rails comprising a plurality of inputs, each having a different input voltage level, wherein each input comprises an input capacitor connected in parallel over the input, as well as switching inputs configured to connect the voltage rail to the respective input.

11. The inductor-less power converter according to claim 2, wherein the converter comprises five switching blocks.

12. The inductor-less power converter according to claim 2, wherein the control unit comprises a memory unit for storing the list of predefined conversion ratio settings, and wherein the list of predefined conversion ratio setting is a sub-selection of all conversion ratio settings possible.

13. The inductor-less power converter according to claim 2, wherein the converter is arranged for a Direct Current (DC) input voltage.

14. The inductor-less power converter according to claim 8, wherein each switching output is activated in a sequential manner for sequentially charging each of the output capacitors.

15. The inductor-less power converter according to claim 10, wherein each switching input is activated in a sequential manner for sequentially charging each of the input capacitors.

16. An energy harvester arrangement comprising:
an energy harvesting module for harvesting ambient energy, selected from the group consisting of: solar energy, thermal energy, motion energy and radio frequency energy, and providing the harvested energy as an input voltage to the energy harvester arrangement; and
an inductor-less power converter according to claim 1.

17. The energy harvester arrangement according to claim 16, wherein the arrangement further comprises:
a maximum power point tracking module, wherein the maximum power point tracking module is operated as the control unit of the inductor-less power converter, to operate switching of each switching block of the power converter according to a maximum power point tracking algorithm selected in accordance with steady state voltage of each flying capacitor to be equal between each conversion ratio setting.

* * * * *